United States Patent
Ye (10) Patent No.: US 9,366,135 B2
(45) Date of Patent: Jun. 14, 2016

(54) AUTOMATIC DIP PICKING FROM WELLBORE AZIMUTHAL IMAGE LOGS

(71) Applicant: Shin-Ju Chu Ye, Spring, TX (US)

(72) Inventor: Shin-Ju Chu Ye, Spring, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 0 days.

(21) Appl. No.: 14/473,060

(22) Filed: Aug. 29, 2014

(65) Prior Publication Data

US 2015/0098627 A1    Apr. 9, 2015

Related U.S. Application Data

(60) Provisional application No. 61/888,458, filed on Oct. 8, 2013.

(51) Int. Cl.
| | |
|---|---|
| *G06K 9/00* | (2006.01) |
| *E21B 49/00* | (2006.01) |
| *G01V 1/50* | (2006.01) |

(52) U.S. Cl.
CPC .. *E21B 49/00* (2013.01); *G01V 1/50* (2013.01)

(58) Field of Classification Search
None
See application file for complete search history.

(56) References Cited

U.S. PATENT DOCUMENTS

| | | | |
|---|---|---|---|
| 4,316,250 A | 2/1982 | Vincent | |
| 4,348,748 A | 9/1982 | Clavier et al. | |
| 4,355,357 A | 10/1982 | Chan | |
| 4,517,835 A | 5/1985 | Kerzner | |
| 4,541,275 A | 9/1985 | Kerzner | |
| 4,780,857 A | 10/1988 | Lyle et al. | |
| 4,852,005 A | 7/1989 | Hepp et al. | |
| 4,853,855 A | 8/1989 | Kerzner | |
| 5,162,994 A | 11/1992 | Torres | |
| 5,299,128 A | 3/1994 | Antoine et al. | |
| 5,678,643 A | 10/1997 | Robbins et al. | |
| 5,704,436 A | 1/1998 | Smith et al. | |
| 5,767,399 A | 6/1998 | Smith et al. | |
| 5,794,720 A | 8/1998 | Smith et al. | |
| 5,889,729 A | 3/1999 | Frenkel et al. | |

(Continued)

FOREIGN PATENT DOCUMENTS

| | | |
|---|---|---|
| WO | WO 97/45757 | 12/1997 |
| WO | WO 99/31530 | 6/1999 |

(Continued)

OTHER PUBLICATIONS

Antoine, J-N. et al. (1993), "A Method to Derive Dips from Bedding Boundaries in Borehole Images, *SPE Formation Evaluation*, pp. 96-102".

(Continued)

*Primary Examiner* — Feng Niu
(74) *Attorney, Agent, or Firm* — ExxonMobil Upstream Research Co., Law Dept.

(57) ABSTRACT

Method for automatically determining a planar event such as a bedding plane from azimuthal wellbore log data (501). The image log may optionally first be filtered using a smoothing filter (502). Then, the image log is inputted to a gradient (first-derivative) filter (503). The image log is also used to find the optimal local sinusoidal trend (or orientation) on the image by determining the best sine wave at each depth among all azimuthal curves from the image using a minimum-variance method (504). Finally, bed boundaries are located based on highest contrast (506) calculated along the sinusoidal lines on the gradient image (505).

15 Claims, 6 Drawing Sheets

(56) References Cited

U.S. PATENT DOCUMENTS

| | | | |
|---|---|---|---|
| 5,899,958 A | 5/1999 | Dowell et al. | |
| 5,960,371 A | 9/1999 | Saito et al. | |
| 5,983,163 A | 11/1999 | Waid et al. | |
| 6,088,656 A | 7/2000 | Ramakrishnan et al. | |
| 6,109,368 A | 8/2000 | Goldman et al. | |
| 6,125,203 A | 9/2000 | Keskes et al. | |
| 6,131,673 A | 10/2000 | Goldman et al. | |
| 6,226,595 B1 | 5/2001 | Rossi et al. | |
| 6,266,618 B1 | 7/2001 | Ye et al. | |
| 6,374,926 B1 | 4/2002 | Goldman et al. | |
| 6,381,542 B1 | 4/2002 | Zhang et al. | |
| 6,408,953 B1 | 6/2002 | Goldman et al. | |
| 6,612,382 B2 | 9/2003 | King | |
| 6,766,254 B1 | 7/2004 | Bradford et al. | |
| 6,795,774 B2 | 9/2004 | Xiao et al. | |
| 6,819,111 B2 | 11/2004 | Fanini et al. | |
| 7,032,689 B2 | 4/2006 | Goldman et al. | |
| 7,035,778 B2 | 4/2006 | Goldman et al. | |
| 7,085,696 B2 | 8/2006 | King | |
| 7,114,565 B2 | 10/2006 | Estes et al. | |
| 7,136,510 B2 | 11/2006 | Van Ginkel et al. | |
| 7,200,492 B2 | 4/2007 | Hassan et al. | |
| 7,236,887 B2 | 6/2007 | Wang et al. | |
| 7,261,167 B2 | 8/2007 | Goldman et al. | |
| 7,272,504 B2 | 9/2007 | Akimov et al. | |
| 7,283,910 B2 | 10/2007 | Hassan et al. | |
| 7,357,196 B2 | 4/2008 | Goldman et al. | |
| 7,366,616 B2 | 4/2008 | Bennett et al. | |
| 7,599,825 B2 | 10/2009 | Yang et al. | |
| 7,630,872 B2 | 12/2009 | Xia et al. | |
| 7,647,182 B2 | 1/2010 | Hassan et al. | |
| 7,814,036 B2 | 10/2010 | Chen et al. | |
| 8,195,399 B2 | 6/2012 | Gladkikh et al. | |
| 8,219,319 B2 | 7/2012 | Skelt | |
| 8,301,381 B2 | 10/2012 | Montaron | |
| 8,437,962 B2 | 5/2013 | Craig et al. | |
| 8,442,769 B2 | 5/2013 | Phillips et al. | |
| 8,442,770 B2 | 5/2013 | Bruun et al. | |
| 8,473,212 B2 | 6/2013 | Tabanou et al. | |
| 8,489,375 B2 | 7/2013 | Omeragic et al. | |
| 8,490,693 B2 | 7/2013 | Birchwood et al. | |
| 8,504,341 B2 | 8/2013 | Cullick et al. | |
| 8,548,785 B2 | 10/2013 | Chugunov et al. | |
| 8,600,716 B2 | 12/2013 | Bradford | |
| 8,614,577 B2 | 12/2013 | Proett et al. | |
| 8,725,477 B2 | 5/2014 | Zhang et al. | |
| 8,949,098 B2 | 2/2015 | King | |
| 9,164,188 B2 | 10/2015 | Bruun et al. | |
| 9,176,245 B2 | 11/2015 | Craig et al. | |
| 2005/0192753 A1 | 9/2005 | Wang et al. | |
| 2006/0095240 A1 | 5/2006 | Elisabeth et al. | |
| 2007/0244646 A1 | 10/2007 | Zhang et al. | |
| 2009/0006058 A1 | 1/2009 | King | |
| 2009/0262603 A1 | 10/2009 | Hurley et al. | |
| 2011/0091078 A1 | 4/2011 | Kherroubi et al. | |
| 2011/0120706 A1 | 5/2011 | Craig | |
| 2012/0293178 A1 | 11/2012 | Proett et al. | |
| 2013/0170713 A1 | 7/2013 | Kumar et al. | |
| 2014/0058677 A1 | 2/2014 | Combee | |
| 2014/0286539 A1 | 9/2014 | Shetty et al. | |

FOREIGN PATENT DOCUMENTS

| | | |
|---|---|---|
| WO | 02/50571 | 6/2002 |
| WO | WO 02/50571 | 6/2002 |
| WO | WO 2013/066682 | 5/2013 |
| WO | WO 2013/119449 | 8/2013 |

OTHER PUBLICATIONS

Easton, S.B. et al. (1983), "Formation Dip Determination Using Digital Wellsite Processing Techniques," SPE 12181, 58$^{th}$ Annual Conf. and Exh., 9 pgs.

Hepp, V. et al. (1975), "Cluster—A Method for Selecting the Most Probable Dip Results from Dipmeter Surveys," SPE 5543, *Society of Petroleum Engineers*, 16 pgs.

Kemp, F. (1980), "An Algorithm for Automatic Dip Computation," *Computers & Sciences* 6, pp. 193-209.

Kerzner, M.G. (1982), "An Analytical Approach to Detailed Dip Determination Using Frequency Analysis," SPWLA 23$^{rd}$ Annual Logging Symposium, paper J, 17 pgs.

Kerzner, M.G. (1983), "Formation Dip Determination—An Artificial Intelligence Approach," *The Log Analyst*, pp. 10-22.

Moran, J.H. et al. (1962), "Automatic Computation of Dipmeter Logs Digitally Recorded on Magnetic Tapes," SPE 174, *Petroleum Logs*, pp. 771-782.

Sasseen, J.H. (1957), "An Electronig Analog Cross Correleator for Dip Logs," *IRE Transactions on Electronig Computers* 37(1), pp. 182-187.

Schoonover, L.G. et al. (1973), "Computer Methods of Diplog Correlation," *Society of Petroleum Engineers Journal*, pp. 31-38.

van Ginkel, M. et al. (2000), "Robust Curve Detection Using a Radon Transform in Orientation Space Applied to Fracture Detection in Borehole Images," *ASCI*, pp. 84-91.

Vincent, Ph. Et al. (1979), "An Approach to Detailed Dip Determination Using Correlation by Pattern Recognition," *Journal of Petroleum Technology*, pp. 232-240.

Ye, S-J. et al. (1997), "Automatic High Resolution Sedimentary Dip Detection on Borehole Imagery," SPWLA 38$^{th}$ Annual Logging Symposium, 13 pgs.

Ye, S-J. et al. (1998), "Automated Fracture Detection on High Resolution Resistivity Borehole Imagery," SPE 49300, Society of Petroleum Engineers, pp. 777-784.

*International Search Report & Written Opinion*, PCT/2014/053429, dated Feb. 24, 2015.

Press, W.H., et al., (1992), "Numerical Recipes in C: The Art of Scientific Computing", Cambridge University Press, 9 pages.

AUTOMATIC DIP PICKING FROM WELLBORE AZIMUTHAL IMAGE LOGS

CROSS-REFERENCE TO RELATED APPLICATION

This application claims the benefit of U.S. Provisional Patent Application 61/888,458, filed Oct. 8, 2013, entitled AUTOMATIC DIP PICKING FROM WELLBORE AZIMUTHAL IMAGE LOGS, the entirety of which is incorporated by reference herein.

FIELD OF THE INVENTION

This disclosure relates generally to the field of hydrocarbon prospecting and reservoir delineation using petrophysics techniques in processing of well logs. Specifically, the invention is a method for automatic dip picking from wellbore azimuthal image logs.

BACKGROUND OF THE INVENTION

Dips are geological bedding surfaces, such as sedimentary beds, fractures, faults, etc., which may or may not be flat or perpendicular to a wellbore. Dip information, e.g. azimuthal density images, obtained from well logs is an important source of information for structural analysis. It provides critical controls for reservoir modeling with important implication for STOOIP (Original Oil In Place). It is also basic input information to create earth models for modeling logging tool responses in petrophysical analysis.

The manual dip picking process is time-consuming and ergonomic-unfriendly. It usually takes many hours to process a well. The cost quickly builds up, and petrophysical evaluation can be heavily delayed, when a large number of wells needs to be processed. Besides, hand picking is subjective, yields higher uncertainty than automatic picking, and is affected by the image visualization mode, such as colormap, image value range, depth scale, etc.

Automatic dip picking takes advantage of the precise, tireless computational ability of a computer. Not only is it faster, lowers cost, avoids ergonomic issues, it is also more objective and reduces dip uncertainty. Petrophysicists need only to quality-check the results, focus on high-level interpretational work, and thus improve overall work quality.

Many automatic dip picking methods for dipmeter and pad-type image logs were developed since the 1950's. Many of these methods were published, including more than 20 patents since 1982, each of these methods tied to specific type of tools such as dipmeter tools or partial wellbore coveraged pad-type images. But they are unsuitable and unreliable to process full wellbore azimuthal image data.

More recently, LWD (logging while drilling) image data from conventional logging tools, such as gamma-ray, density, neutron, acoustic, and resistivity, etc., are extensively, routinely acquired in operations worldwide. No reliable automatic dip picking method is available for full wellbore image logs. The present invention addresses this technology gap. Although the present invention was originally designed for the full wellbore azimuthal type of images, it can also apply to any previous dipmeter and pad-type image logs, as will be explained below.

For old dipmeter logs consisting of 3, 4, 6 or 8 curves, the patents and publications listed next are based on two-curve (or pad-to-pad) correlation. The patents include: U.S. Pat. Nos. 4,316,250, 4,348,748, 4,355,357, 4,517,835, 4,541,275, 4,852,005, and 4,853,855. Publications include:

1. Sasseen, "An Electronic Analog Cross Correlator for Dip Logs," Proc. IRE 37, No. 1, 10 (1957).
2. Moran et al., "Automatic Computation of Dipmeter Logs Digitally Recorded on Megnetic Tapes", *Journal of Petroleum Techology*, July 1962, pp. 771-782 (1962).
3. Schoonover, "Computer Methods of Diplog Correlation," *Society of Petroleum Engineers Journal*, Feb. 1973, pp. 31-38 (1973).
4. Hepp, "Cluster—A method for selecting the most probable dip results from dipmeter surveys," *Society of Petroleum Engineers*, SPE 5543 (1975).
5. Vincent et al., "An Approach to Detailed Dip Determination Using Correlation by Pattern Recognition," *Journal of Petroleum Techology*, 232-240 (1979).
6. Kemp, "An Algorithm for Automatic Dip Computation," *Computers & Geosciences* 6, 193-209 (1980).
7. Kerzner, "An Analytical Approach to Detailed Dip Determination Using Frequency Analysis," *Society of Petrophysicists and Well Log Analysts, SPWLA 23$^{rd}$ Annual Logging Symposium*, July 6-9, 1982, paper J.
8. Kerzner, "Formation Dip Determination—An Artificial Intelligence Approach," *The Log Analyst*, September-October (1983), 10-22.
9. Easton, "Formation Dip Determination Using Digital Wellsite Processing Techniques," *Society of Petroleum Engineers*, SPE 12181 (1983).

These methods look for the depth shift generating maximum correlation value between each pair of dipmeter curves, and then find an optimal closure among all curves (i.e. fit a sine wave) to determine a best local sine wave. They differ from each other by their correlation methods and fitting optimization details. However, the present invention uses a different approach: the curves are correlated collectively using variances, not two by two, along sinusoidal lines and select the sine wave of minimum variance is selected without the need for sine wave fitting.

For image logs including pad-type and full-wellbore images, most of the patents and publications found in the literature (listed below) use edge detection and the Hough transform approach. These methods first find highly contrasted segments (or edges), then search for the best sine waves in the Hough (or parametric) space. Some other methods use other approaches such as frequency analysis, or edge detection combined with sine wave fitting, etc. They are detailed separately below. None of the methods uses a minimum-variance approach.

It will be explained below that the present invention first detects the global image sinusoidal trends, then examines detailed bed contrast to locate the bed boundaries. Most of the methods described in the literature used edge detection and Hough transform (or sine wave fitting). These methods are unreliable and highly affected by the noises on the image as they immediately focus on the detailed image features, which are highly affected by the noises, and overlook the global image patterns.

Methods using Hough transform include U.S. Pat. Nos. 5,162,994, 5,960,371, US 2005/0192753, U.S. Pat. No. 7,236,887[1], US 2011/0091078, and U.S. Pat. No. 7,136,510. Methods using frequency analysis include U.S. Pat. Nos. 5,983,163, 7,283,910, and 7,200,492. Methods using image local orientations include:

1. Van Genkel, "Robust Curve Detection using a Radon Transform in Orientation Space Applied to Fracture Detection in Borehole Images", ASCI (2000).
2. Ye et al., 1997, "Automatic High Resolution Sedimentary Dip Detection on Borehole Imagery," *Society of*

*Petrophysicists and Well Log Analysts*, SPWLA paper "O" (second method in the paper: lamination plane detection).

The Ye et al. 1997 paper uses a "linear" (straight-line) minimum-variance method to determine linear (straight-line) local pad-image orientation, then fit the tangent of the sine waves to the linear local pad-image orientations with a least-mean-square method. In contrast, the present invention uses minimum-variance along "sinusoidal lines" instead of sine wave fitting.

Methods using edge detection and sine wave fitting include U.S. Pat. Nos. 5,299,128, 6,266,618 and 6,226,595 and the following publications:
1. Antoine, "A Method to Derive Dips from Bedding Boundaries in Borehole Images," SPE Formation Evaluation (1993).
2. Ye et al., "Automatic High Resolution Sedimentary Dip Detection on Borehole Imagery", *Society of Petrophysicists and Well Log Analysts*, SPWLA paper O.—first method described in the paper: bed boundary detection— (1997).
3. Ye et al., "Automated Fracture Detection on High Resolution Resistivity Borehole Imagery",*Society of Petroleum Engineers*, SPE 49300 (1998).

US Patent Publication No. 2012/0293178 describes a method using resistivity anisotropy and exhaustive search.

SUMMARY OF THE INVENTION

In one embodiment, the invention is a method for determining a bedding surface from an azimuthal image made from a signal provided by a logging tool placed in a cylindrical wellbore, said method comprising: (a) determining, using a computer and based on minimum variance, a best sine wave in the image at each of a plurality of selected depths; (b) computing contrast at each selected depth along the best sine wave in the gradient image; and (c) locating one or more bedding surface boundaries at one or more depths with highest contrasts. Optionally, a smoothing filter may be applied to the image before the determining the best sine wave.

The image is preferably filtered with a gradient filter before computing contrast. The best sine wave at a selected depth may be determined by steps comprising: (i) locating a depth window in the image centered at the selected depth, then dividing the window into a plurality of discrete depth increments; (ii) at each depth increment, computing a variance of values in the image along sine waves for a plurality of different amplitude and phase values for the sine waves; (iii) for each combination of amplitude and phase values, summing the variances of all sine waves within the depth window; and (iv) using the amplitude and phase values giving minimum summed variance to determine the best sine wave.

BRIEF DESCRIPTION OF THE DRAWINGS

The present invention and its advantages will be better understood by referring to the following detailed description and the attached drawings in which.

The invention will be described in connection with example embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims.

DETAILED DESCRIPTION OF EXAMPLE EMBODIMENTS

Figure 1:
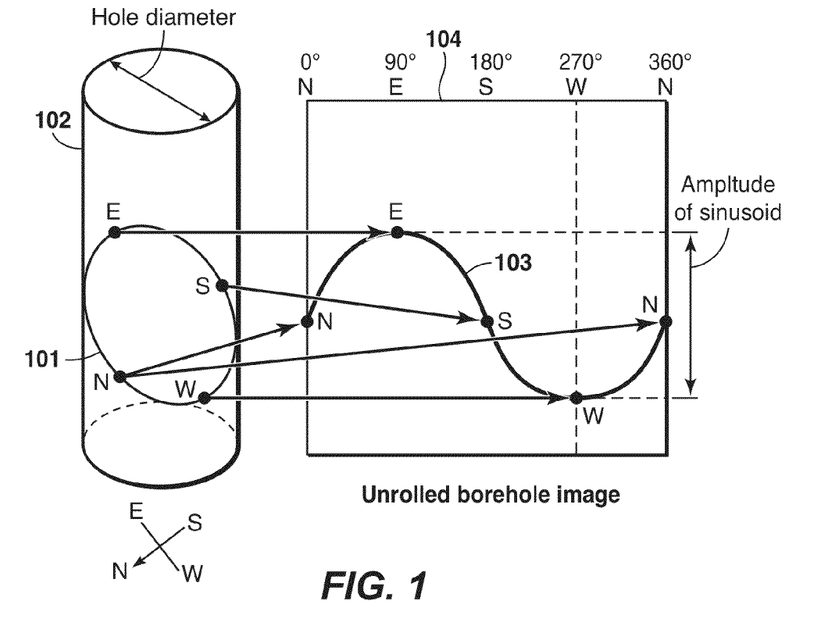
FIG. 1 shows how a geological surface of a bedding plane (or a dip) intercepts a cylindrical wellbore, to be represented as a sinusoidal curve on an unrolled borehole image.

FIG. 1 illustrates how a geological surface of a bedding plane (often referred to as a "dip," whether horizontal or not) 101 that intercepts a cylindrical wellbore 102 is represented as a sinusoidal curve 103 on an unrolled borehole image 104.

Figure 2:
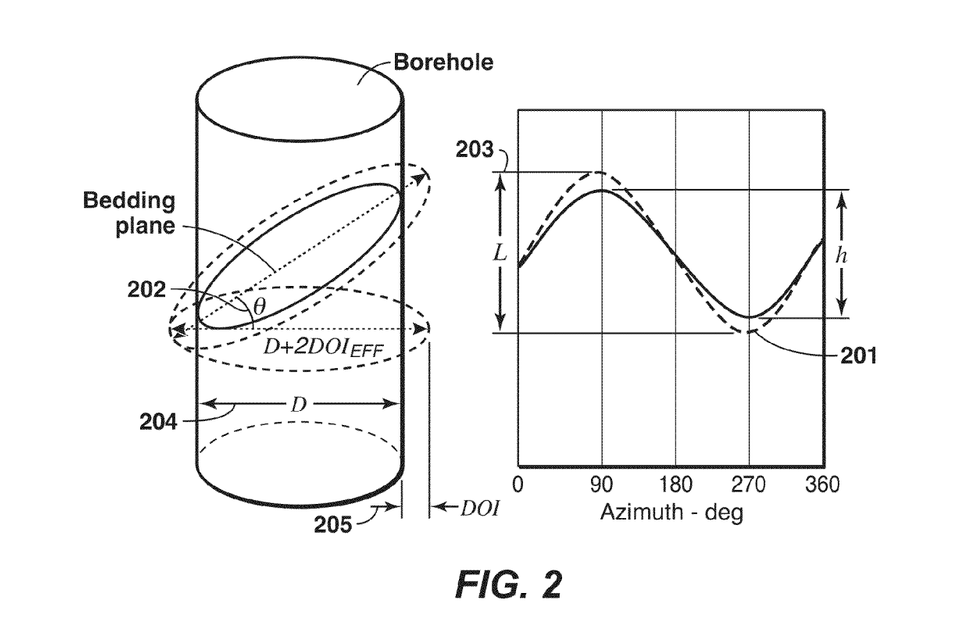
FIG. 2 shows that the apparent (relative to the wellbore) dip azimuth is the deepest direction of the sinusoid phase, whereas the apparent dip angle θ can be calculated from the sinusoid amplitude L with known borehole diameter D and known radial depth of investigation DOI (205) of the logging tool (using equation (1))

The apparent (relative to the wellbore) dip azimuth is the deepest direction of the sinusoid phase (201 in FIG. 2). The apparent dip angle θ (202) can be calculated from the sinusoid amplitude L (203) with known borehole diameter D (204) and known radial depth of investigation DOI (205) of the logging tool using equation (1).

$$\theta = \tan^{-1}\left(\frac{L}{D + 2DOI}\right) \qquad \text{(eq. 1)}$$

Figure 3:
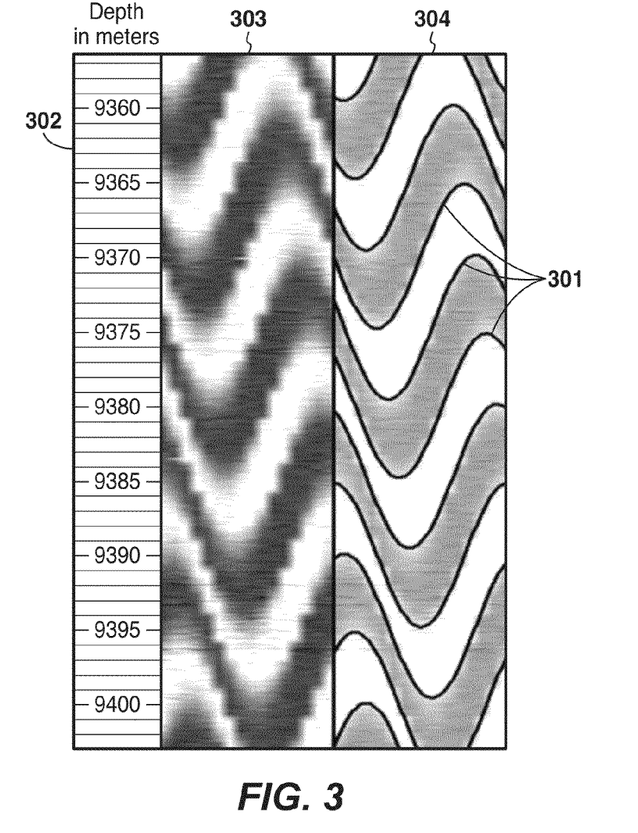
FIG. 3 illustrates that the dips on a borehole image are located at the bed boundaries where the adjacent beds exhibit visible image contrasts, i.e., the adjacent image contrast signals are stronger than the noises presented on the image.
Figure 4:
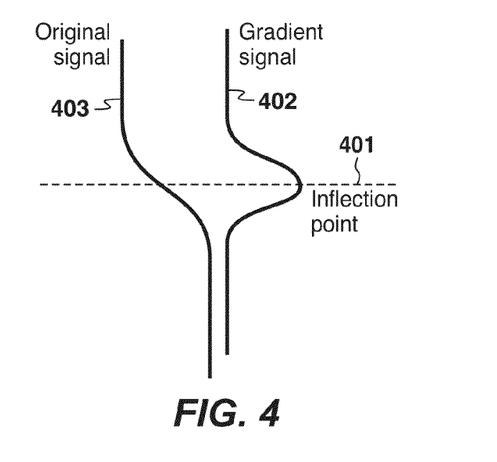
FIG. 4 illustrates that the inflection points are the maxima or minima of the first derivative (or gradient) of the original signal.

The dips (301 in FIG. 3) on a borehole image (302 and 303) are located at the bed boundaries where the adjacent beds exhibit visible image contrasts, i.e., the adjacent image contrast signals are stronger than the noises presented on the image. The first track on the left is a depth track (302). The second track from the left is a borehole image (303). The right-most track (304) is the same borehole image as the second track (303) with sinusoidal dips (301) overlaid on it. The bed boundaries can be placed at the inflection points of the signal where the adjacent beds have the highest contrast. The inflection points (401 in FIG. 4) are the maxima or minima of the first derivative (or gradient) 402 of the original input signal 403 of the image log.

With this background, one embodiment of the present invention can be summarized as follows (the numbered steps refer to the flow chart of FIG. 5):
A. Filter the input image log 501 using smoothing filter (502) and gradient (first-derivative) (503) filter.
B. At each depth, find the optimal local sinusoidal trend on the image by determining the best correlated sine wave among all azimuthal bins from the smoothed image using minimum-variance method (504).

Figure 5:
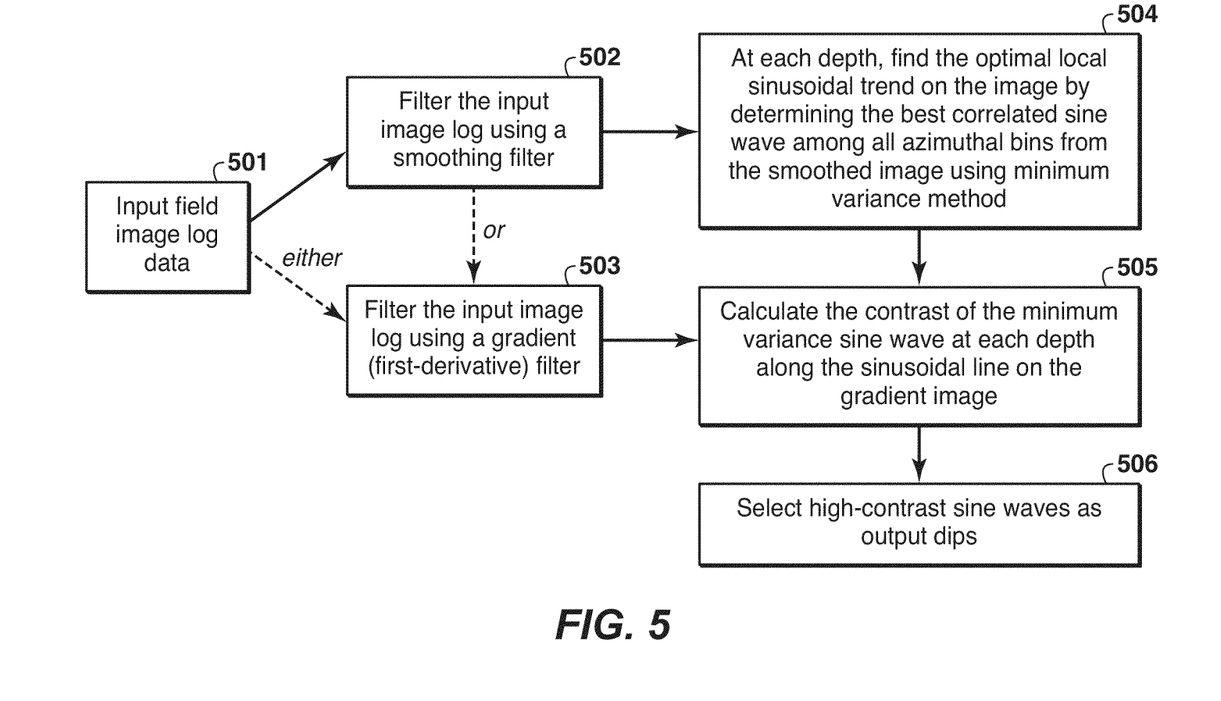
FIG. 5 is a flow chart showing basic steps in the automatic dip picking method of the present invention.

C. (505) Calculate the contrast of the sine wave at each depth along the sinusoidal line on the gradient image from 503.

D. Select high-contrast sine waves as output dips (506).

Further details are provided below:

(A) Image Filtering

Figure 6:
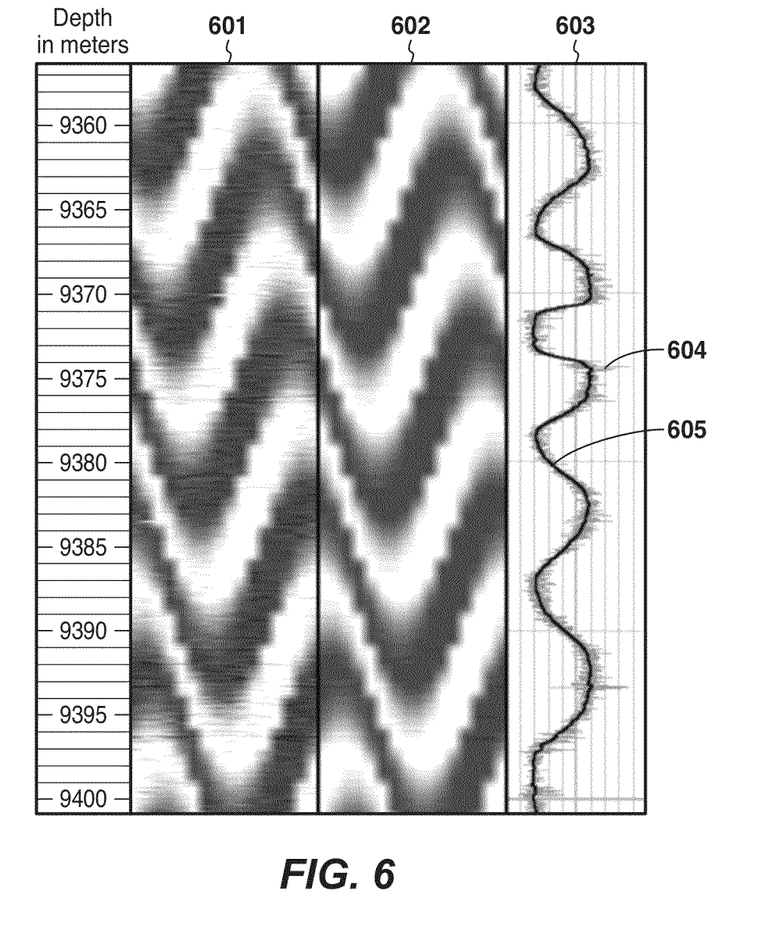
FIG. 6 illustrates the effect of image smoothing on a borehole image log.

In step 502, if noise is present in the input borehole image, smooth the input field image log 501 using a smoothing filter as input image for step 504. The purpose of image smoothing is to remove uncorrelated high-frequency random noises from data acquisition. Example results of image smoothing are shown in FIG. 6. The second track from the left (601) is the original noisy input borehole image. Track 602 is the smoothed borehole image. The first traces (or bins) of the original and smoothed images are displayed on the right-most track (603) where the gray spiky curve 604 is the first trace (or bin) of the original noisy input image 601, and the black smoothed curve 605 is the first trace (or bin) of the smoothed image 602.

In step 503, the first-derivative image is computed using a gradient filter as input image for step 505. Either the input field image 501 or the smoothed image 502 can be used for this computation. The gradient filter applied here may also smooth the image, and if it does, the original input field image 501 can be used. Otherwise, if the noises are present on the input borehole image, the smoothed image 502 is the preferable input for step 503.

The particular choices of smoothing filter and gradient filter are usually not critical. Typically, any filters (linear or non-linear) can be used.

(B) Determine the Optimal Local Sinusoidal Trends at Each Depth

Figure 7:
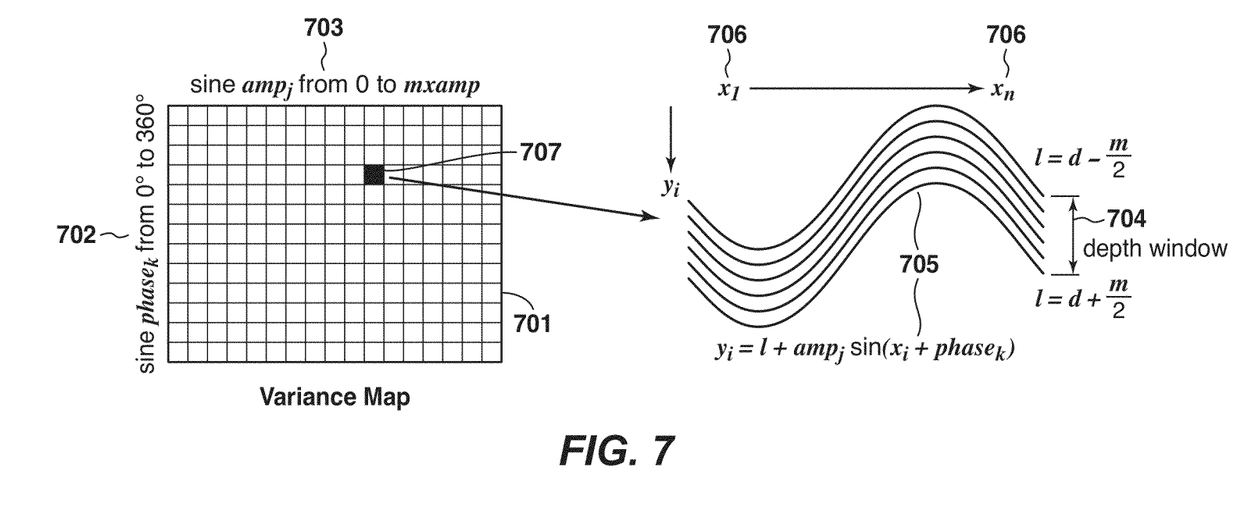
FIG. 7 is a schematic diagram illustrating the minimum-variance method of the present invention for determining the optimal local sinusoidal trend on a borehole image.

This is step 504, and in this step, a minimum-variance method is performed to determine the optimal local sinusoidal trend in the borehole image from step 502. FIG. 7 illustrates how the minimum-variance method may be performed in one embodiment of the present invention. For each depth d, a variance map 701 is generated: for every possible sinusoid phase $phase_k$ from 0° to 360° (702) and amplitude $amp_j$ from 0 to mxamp (703) where mxamp is a predefined maximum amplitude to be detected, perform the following:

(i) Within a depth window 704 of length m+1, centered at depth d, from depth $$l = d - \frac{m}{2} \text{ to } d + \frac{m}{2},$$

for each sinusoidal curve 705 at depth l, $$y_i = l + amp_j \sin(x_i + phase_k),$$

where i=1 to n and n is the number of azimuthal data points (706), compute a variance $V(j,k)_l$ along the sinusoidal curve on the smoothed image from step 502 using equation 2 below:

$$V(j,k)_l = \text{Var}_{i=1}^n \{\text{Smoothed\_image}[x_i, l + amp_j \sin(x_i + phase_k)]\}. \quad (eq. 2)$$

In addition to the number of azimuthal bins available on the image log, the variance $(V(j,k)_l)$ estimation can be improved by adding interpolated data points between each pair of azimuthal bin data along the sinusoidal curve. Therefore the number of total azimuthal data points n may be the number of azimuthal bins available on the image log multiplied by the number of interpolated virtual data points between each pair of bins.

In the case of high sinusoid amplitudes, the sine waves pass through a long section of the borehole image. When only a small number of azimuthal bins are available, several quite large sections of intermediate features along a sine wave may be ignored due to scarcity of data points. This may generate unreliable results. Although a large depth window/can enhance the results due to small number of azimuthal bins, the process of adding interpolated virtual data points between bins can further remove aberrant results.

(ii) Sum up the variances of all the sine curves within the depth window 704 from $$l = d - \frac{m}{2} \text{ to } d + \frac{m}{2}$$

using equation 3 below:

$$V(j,k) = \sum_{l=d-\frac{m}{2}}^{d+\frac{m}{2}} V(j,k)_l, \quad (eq. 3)$$

then store V(j,k) in the corresponding location of the variance map (707).

To finish step 504, the sinusoid phase and amplitude giving the minimum variance on the variance map 701 is retained, and may be stored in computer memory or storage.

(C) Calculate the Sine Wave Contrasts

This is step 505 in FIG. 5. The contrast of a sinusoidal curve can be quantified from the gradient image computed in step 503. At each depth, estimate the contrast GQI of the minimum-variance sinewave generated in step 504 by taking the absolute value of the sum of the points along the sinusoidal curve on the gradient image (see eq. 4) where i=1 to n and n is the number of azimuthal data points.

$$GQI = \left| \sum_{i=1}^n \text{Gradient\_image}[x_i, \text{amp} \sin(x_i + \text{phase})] \right| \quad (eq. 4)$$

Similar to the variance calculation, the contrast (GQI) estimation can be improved by adding interpolated data points between each pair of azimuthal bin data along the sinusoidal curve. Therefore the number of total azimuthal data points n may be the number of azimuthal bins available on the image log multiplied by the number of interpolated virtual data points between each pair of bins.

In the case of high sinusoid amplitudes, the sine waves pass through a long section of the borehole image. When only a small number of azimuthal bins are available, several quite large sections of intermediate features along a sine wave may be ignored due to scarcity of data points. This may generate unreliable results. Unlike the variance calculation, which uses many sinusoidal lines within a depth window, the contrast estimation uses only one sinusoidal line, so it is more advantageous here to add more data points between bins to remove aberrant results.

Figure 8:
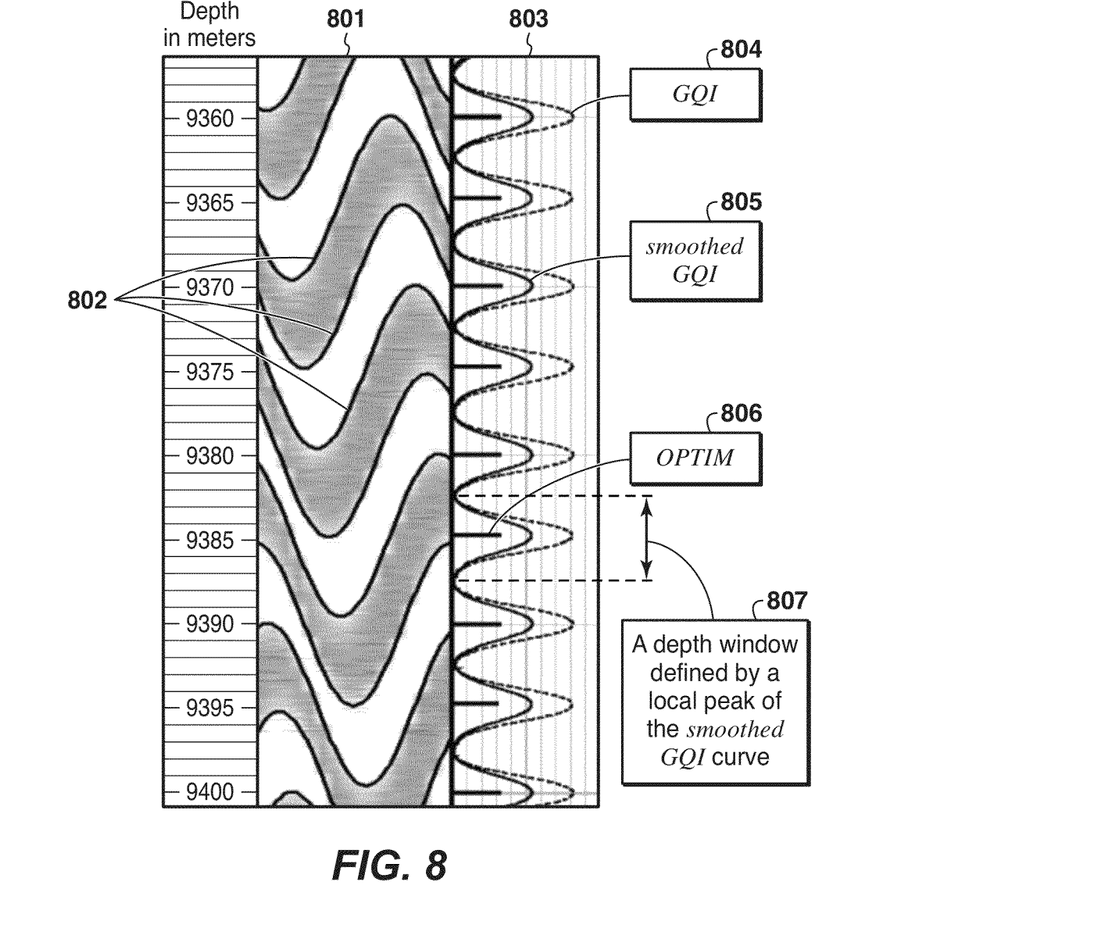
FIG. 8 shows test example results for the present inventive method.

An example of a GQI curve, showing the contrast of the minimum-variance sine wave at each depth, is 804 in FIG. 8.

(D) Select High-Contrast Sine Waves as Output Dips

This is step 506 in FIG. 5. An automated process for determining high-contrast bed boundaries in one embodiment of the present invention is described below:

(i) Smooth the GQI curve 804 to obtain a smoothed GQI curve 805. The same smoothing filter used in step 502 may be applied to smooth the GQI curve. This smoothing step is optional, and can be omitted in some cases. It was designed to reduce noise in the GQI curve in the case of actual field data. In the example of FIG. 8, the borehole image 801 is synthetic data, and so the GQI curve already is quite smooth, so it is unnecessary to smooth the GQI curve.

(ii) Select the sine wave of maximal GQI value within each depth window 807 defined by a local peak of the smoothed-GQI curve (or original GQI curve if smoothing is omitted) as a local high-contrast sine wave.

(iii) Assign the quality indexes OPTIM (806) to the selected high-contrast sine waves from (ii). The original GQI value can be directly assigned to OPTIM, or, among other possibilities, equation 5 below may be used so that the relative quality index of erratic sine waves due to image noises may be reduced:

$$OPTIM = \frac{GQI^2}{(GQI - \text{smoothed } GQI)}. \quad (\text{eq. 5})$$

(iv) Cut off low-contrast, erratic sinewaves using OPTIM. The cutoff value can either be pre-set or set by the user post-processing. A low cutoff value of OPTIM usually suffices and can be generalized to all the field data thanks to the robustness of minimum-variance method and optimization of the quality index OPTIM.

An example of resulting sine waves is displayed at 802 in FIG. 8.

The GQI curve, smoothed GQI curve, and OPTIM sticks are displayed at different scales. They were scaled so they can easily be seen and annotated in this black and white drawing.

The present invention can also apply to dipmeter and pad-type image logs. The main difference between full wellbore image and other types of dipmeter and image logs is that, in the full wellbore image, the azimuthal bins are regularly sampled at each depth. On the other hand, in the dipmeter and pad-type image logs, there are gaps between azimuthal data points, i.e. only certain azimuthal data points are available, and the azimuths of available data points rotate with depth due to the logging tool rotation.

In the case of application of present invention to dipmeter and pad-type image logs, the ranges and positions of azimuthal data points (e.g. in steps 504 and 505) at each depth can be calculated based on the tool configuration and tool rotation information which is always acquired together with the dipmeter and pad-type image logs in order to reconstruct and orient the dipmeter and image logs correctly. All other steps are the same as described above.

The automatic dip picking method of the present invention emulates the human pattern recognition process, which first observes the global image sinusoidal trends (step 504), then examines detailed bed contrast to locate the bed boundaries (steps 505 and 506).

Conventional pattern fitting methods using edge detection and Hough transform (or sine wave fitting) are unreliable and highly affected by the noises on the image as they immediately focus on the detailed image features, which are highly affected by the noise, and overlook the global image patterns.

Other correlation methods were tested, but the minimum-variance method emerged as the preferred embodiment of this disclosure because it generated the most consistent sine waves. It correlates all azimuthal bins simultaneously, much more reliable than two-curve correlation methods. As the variances are calculated along sinusoidal lines, there is no need for sine wave fitting.

The minimum-variance method described in the present application merges the conventional, complicated, two-step dipmeter processing methodology (first curve correlation, then sine wave fitting) into one single step to determine an optimal local sine wave. With fewer steps, there are fewer scenarios and problems to consider and fewer parameters to adjust. It is therefore more reliable and easier to use and implement.

The present invention is flexible. Each depth is free to find the best fitting sine wave within a full range of searching parameters (amplitude and phase). It can find fractures and faults if visible, reversed sine waves in bulls-eye sections where the wellbore is almost parallel to the bedding planes, etc.

The foregoing application is directed to particular example embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims. As will be obvious to the reader who works in the technical field, the present inventive method is intended to be fully automated, or almost fully automated, using a computer programmed in accordance with the disclosures herein.

The invention claimed is:

1. A method for determining a bedding surface from an azimuthal image made from a signal provided by a logging tool placed in a cylindrical wellbore, said method comprising:
    determining, using a computer and based on minimum variance, a best sine wave in the the minimum variance represents a minimum value in a variance map of sine waves of the azimuthal image;
    computing contrast at each selected depth along the best sine wave in the azimuthal image; and
    locating one or more bedding surface boundaries at one or more depths with highest contrasts.

2. The method of claim 1, further comprising filtering the azimuthal image with a gradient filter before computing contrast.

3. The method of claim 2, wherein the contrast is based directly on the azimuthal image produced by the gradient filter, or is based upon a figure of merit that depends upon the azimuthal image produced by the gradient filter.

4. The method of claim 1, wherein determining a best sine wave at a selected depth comprises:
    locating a depth window in the azimuthal image centered at the selected depth, then dividing the window into a plurality of discrete depth increments;
    at each depth increment, computing a variance of values in the azimuthal image along sine waves for a plurality of different amplitude and phase values for the sine waves;
    for each combination of amplitude and phase values, summing the variances of all sine waves within the depth window; and
    using the amplitude and phase values giving minimum summed variance to determine the best sine wave.

5. The method of claim 1, further comprising applying a smoothing filter to the azimuthal image before the determining a best sine wave.

6. The method of claim 1, wherein the variance is computed using image data at each azimuthal bin derived from the logging tool signal.

7. The method of claim 6, further comprising using interpolated data between available azimuthal bins to provide more variance information.

8. The method of claim 1, wherein the contrast is computed for image data at each azimuthal bin provided by the logging tool, then summed over azimuthal bins.

9. The method of claim 8, further comprising using interpolated data between available azimuthal bins to provide more contrast information.

10. The method of claim 1, wherein the azimuthal logging tool is one of a group consisting of a gamma-ray tool, a density tool, a neutron tool, an acoustic tool, and a resistivity tool.

11. The method of claim 1, wherein the method is fully automated, i.e. all actions in the method are performed using a computer.

12. A non-transitory computer usable medium having a computer readable program code embodied therein, said computer readable program code adapted to be executed to implement a method for determining a bedding surface from an azimuthal image made from a signal provided by a logging tool placed in a cylindrical wellbore, said method comprising:
  determining, based on minimum variance, a best sine wave in the azimuthal image at each of a plurality of selected depths, wherein the minimum variance represents a minimum value in a variance map of sine waves of the azimuthal image;
  computing contrast at each selected depth along the best sine wave in the azimuthal image; and
  locating one or more bedding surface boundaries at one or more depths with highest contrasts.

13. The non-transitory computer usable medium of claim 12, wherein said method further comprises filtering the azimuthal image with a gradient filter before computing contrast.

14. The non-transitory computer usable medium of claim 12, wherein determining a best sine wave at a selected depth comprises:
  locating a depth window in the azimuthal image centered at the selected depth, then dividing the window into a plurality of discrete depth increments;
  at each depth increment, computing a variance of values in the azimuthal image along sine waves for a plurality of different amplitude and phase values for the sine waves;
  for each combination of amplitude and phase values, summing the variances of all sine waves within the depth window; and
  using the amplitude and phase values giving minimum summed variance to determine the best sine wave.

15. The non-transitory computer usable medium of claim 12, wherein said method further comprises applying a smoothing filter to the azimuthal image before the determining a best sine wave.

* * * * *